United States Patent [19]

Inoue

[11] Patent Number: 5,779,591
[45] Date of Patent: Jul. 14, 1998

[54] TOROIDAL CONTINOUS VARIABLE TRANSMISSION

[75] Inventor: Eiji Inoue, Sagamihara, Japan

[73] Assignee: Isuzu Motors Limited, Tokyo, Japan

[21] Appl. No.: 770,255

[22] Filed: Dec. 20, 1996

[30] Foreign Application Priority Data

Dec. 22, 1995 [JP] Japan .................... 7-349460

[51] Int. Cl.$^6$ .................................... F16H 15/38
[52] U.S. Cl. .................... 476/42; 476/10; 476/46
[58] Field of Search .................. 476/42, 46, 10

[56] References Cited

U.S. PATENT DOCUMENTS 5,419,746  5/1995  Nakano .................... 476/42 X

FOREIGN PATENT DOCUMENTS 07-096901  10/1995  Japan .

Primary Examiner—Charles A. Marmor
Assistant Examiner—Ankur Parekh
Attorney, Agent, or Firm—Browdy and Neimark

[57] ABSTRACT

The toroidal continuous variable transmission is constructed so that the thrust-directional position of the toroidal speed change unit is determined by a component manufactured with high dimensional precision. The output disks, because they are supported on the casing through radial bearings, can change their thrust-directional positions with respect to the casing. The power rollers that are supported on the support shafts secured to the trunnions cannot perform the swinging motion and therefore can form a reference for determining the thrust-directional position with respect to the casing. The power rollers whose support shafts are eccentric shafts rotatably supported on the trunnions can perform the oscillatory motion.

6 Claims, 6 Drawing Sheets

5,779,591

1

TOROIDAL CONTINOUS VARIABLE TRANSMISSION

BACKGROUND OF THE INVENTION

1. Field of the Invention

The present invention relates to a toroidal continuous variable transmission for vehicles and more particularly to a toroidal continuous variable transmission of a double cavity type having two toroidal speed change units mounted on the same shaft.

2. Description of the Prior Art

The toroidal continuous variable transmission generally has a toroidal speed change unit that comprises an input disk, an output disk disposed opposite the input disk and power rollers in frictional contact with these disks and which transmits the rotation of the input disk to the output disk while continuously changing the rotation speed of the input disk by changing a tilt angle of the power rollers. When the above toroidal continuous variable transmission is to be applied to vehicles, general practice is to use a double cavity type toroidal continuous variable transmission having the above-mentioned two toroidal speed change units arranged on the same shaft.

An example of conventional double cavity type toroidal continuous variable transmission is illustrated in FIG. 5 and 6 (see Japanese Patent Publication No. 96901/1995). This toroidal continuous variable transmission has a toroidal speed change unit 1 and a second toroidal speed change unit 2. The first toroidal speed change unit 1 includes an input disk 4 mounted on a main shaft 3 through a ball spline 12; an output disk 5 disposed opposite the input disk 4 and rotatably mounted on the main shaft 3; and tiltable power rollers 6 for transmitting torque from the input disk 4 to the output disk 5. The second toroidal continuous variable transmission includes an input disk 7 mounted on the main shaft 3 through a ball spline 28; an output disk 8 disposed opposite the input disk 7 and rotatably mounted on the main shaft 3; and tiltable power rollers 9 for transmitting torque from the input disk 7 to the output disk 8.

The power rollers 6 are rotatably supported on trunnions 33 through support shafts 34, and the power rollers 9 are rotatably supported on trunnions 37 through rotating shafts 38. Each trunnion 33, 37 has a tilt axis 11, and can move in the direction of the tilt axis 11 and rotate about the tilt axis 11.

The input disk 4 and the input disk 7 are connected to the main shaft 3 through the ball splines 12, 28 and thus can be slid in the thrust direction of the main shaft 3 and rotated integrally with the main shaft 3. The power is transferred from the input shaft 13 through a loading cam 18 to the input disk 4, from which it is further transferred to the input disk 7 through the main shaft 3 with which the input disk 4 rotates together. At this time, when the power is transferred from the loading cam 18 to the input disk 4, a thrust force corresponding to the torque being transferred is generated in the thrust direction by the cam roller 61.

The powers transferred to the input disks 4, 7 are conveyed through the power rollers 6 to the output disk 5 and through the power rollers 9 to the output disk 8, respectively. The output disks 5, 8 are coupled at their backs by an output shaft 22 engaged with the main shaft 3, so that the powers transferred to the output disks 5, 8 are taken out from the output shaft 22. Because the output disks 5, 8 are supported rotatable on a casing 25 by angular ball bearings 62, which support radial and thrust loads through the output shaft 22

2 that couples the output disks 5, 8 so that they rotate together, they cannot be moved in the thrust direction. Hence, as the thrust force is generated, the positions relative to the casing 25 of the output disk 5 and the output disk 8 in the thrust direction are determined first, the positions of the power rollers 6 and the power rollers 9 are determined next, and then the positions of the input disks 4, 7 in the thrust direction are determined.

In the toroidal speed change units 1, 2, the thrust force generated by the loading cam 18 presses the input disks 4, 7 and the output disks 5, 8 strongly against the power rollers 6, 9. The power transfer from the input disks 4, 7 to the output disks 5, 8 is carried out by the thrust force and by the shearing force of oil between the disks 4, 5, 7, 8 and the power rollers 6, 9. Because the input disks 4, 7 and the output disks 5, 8 are elastically deformed by the thrust force, the positions in the thrust direction of the power rollers, 6, 9, the input disks 4, 7 and the output disks 5, 8 change according to the thrust force (i.e., the torque being transmitted).

In the conventional toroidal continuous variable transmission, the power rollers 6, 9 are supported on the trunnions 33, 37, as shown in FIG. 5, by the support shafts (eccentric shafts) 34, 38 offset from the power roller rotating centers in the direction of the tilt axes 11 so that the power rollers 6, 9 can oscillate about the eccentric shafts to absorb positional changes in the thrust direction. That is, the support shafts 34 and the support shafts 38 both have the axes of their ends offset from each other, with one end rotatably supported on the trunnions 33, 37 and the other end rotatably supporting the power rollers 6, 9. The power rollers 6, 9 supported on the support shafts 34, 38 can perform an swinging motion. The oscillating motion of the power rollers 6, 9 can absorb positional changes of each disk in the thrust direction.

With the conventional toroidal continuous variable transmission, however, to support the both output disks in the predetermined thrust-directional position relative to the casing requires a high dimensional precision for the casing, which makes it necessary to perform shim adjustment during assembly, resulting in raising the cost. The casing is made of aluminum for reducing the weight while the input disks, the output disks and the output shaft are made of steel. Because these components are made of different materials and have greatly differing thermal expansion coefficients, the conventional toroidal continuous variable transmission, which determines the positions of the toroidal speed change units in the thrust direction using the casing having a large thermal expansion coefficient, produces plays in the thrust direction due to temperature variations, giving rise to problems that the portions with plays will be worn or the trunnions and the disks with small clearances therebetween will interfere with each other.

SUMMARY OF THE INVENTION

The object of this invention is to solve the above-mentioned problems and to provide a toroidal continuous variable transmission, which determines the thrust-directional positions of the first and second toroidal speed change units by using the portions having high dimensional precision to enable secure and highly precise positioning in the thrust direction even when the dimensional precision of the casing is low and to prevent plays from being produced due to thermal expansion coefficient differences as the temperature varies.

The present invention relates to a toroidal continuous variable transmission which comprises: a first input disk and a second input disk, both rotatable together with a main shaft and axially movable; an input shaft for transferring power to the first input disk through a loading cam; a first output disk disposed opposite the first input disk and rotatable relative to the main shaft; a pair of first power rollers for continuously changing the speed of rotation of the first input disk according to changes in a tilt angle with respect to the first input disk and the first output disk and transferring the speed-changed rotation to the first output disk; a first support shaft for rotatably supporting at one end thereof each of the first power rollers; a pair of first trunnions, each mounted to the other end of the first support shaft, the first trunnion being adapted to be displaced in the tilt axis direction from a neutral position and to tilt about the tilt axis; a second output disk disposed opposite the second input disk and rotatable relative to the main shaft; a pair of second power rollers for continuously changing the speed of rotation of the second input disk according to changes in a tilt angle with respect to the second input disk and the second output disk and transferring the speed-changed rotation to the second output disk; a second support shaft for rotatably supporting at one end thereof each of the second power rollers; a pair of second trunnions, each mounted to the other end of the second support shaft, the second trunnion being adapted to be displaced in the tilt axis direction from a neutral position and to tilt about the tilt axis; and an output shaft connected with the first output disk and the second output disk, the first and second output disks being disposed adjacent to each other; wherein the first output disk and the second output disk are supported on a casing between the output disks through radial bearings, axes of both ends of the first support shaft and of the second support shaft are offset from each other, one of the first and second support shafts is secured nonpivotable to the trunnion, and the other support shaft is mounted pivotable to the trunnion.

In the toroidal continuous variable transmission of the above construction, the first and second output disks are supported on walls of a casing between the output disks through radial bearings, axes of both ends of one of the first and second support shafts are offset from each other, the support shaft whose axis is not off-centered is secured nonpivotable to the trunnion, and the support shaft whose axis is off-centered is mounted pivotable to the trunnion.

In this toroidal continuous variable transmission, the output disk is mounted unrotatable to a cylindrical portion of the output shaft and the cylindrical portion of the output shaft is supported on the casing through the radial bearings.

Alternatively, in this toroidal continuous variable transmission, the output shaft is mounted unrotatable to a cylindrical portion of the output disk and the cylindrical portion of the output disk is supported on the casing through the radial bearings.

Because the toroidal continuous variable transmission is constructed as described above, power is transferred from the input shaft through the loading cam to the first input disk. At the same time, the rotation of the first input disk is also transferred to the second input disk through the main shaft. When the power is transferred from the loading cam to the first input disk, a thrust force of a magnitude corresponding to the torque being transferred is generated by the action of the cam roller. The power transferred to the first input disk is conveyed through the first power rollers to the first output disk. At the same time, the power transferred to the second input disk is conveyed to the second output disk through the second power rollers. The power is further transferred from these output disks to the output shaft that couples together the rear portions of the output disks.

The thrust force produced by the action of the loading cam elastically deforms the first input disk, the first output disk, the second input disk and the second output disk. Here, the axes of both ends of the first and second support shafts are offset from each other or made eccentric; one of these support shafts is mounted unrotatable or unpivotable to one of the trunnions; and the other support shaft is mounted pivotable to the other trunnion. For example, the first support shaft is mounted unrotatable or unpivotable to the first trunnion and the second support shaft is mounted pivotable to the second trunnion. In this case, the first power rollers cannot perform the swing motion relative to the first trunnions. However, the first output disk and the second output disk are supported on the casing through the radial bearings that support only radial loads and the second power rollers are supported swingable on the second trunnions, so that the toroidal continuous variable transmission can absorb changes in the thrust-directional position caused by deformations of these disks.

Further, when the axes of both ends of one of the first and second support shafts are offset from each other or made eccentric and the off-centered support shaft is mounted pivotable to one of the trunnions, for example, when the axes of both ends of the first support shaft are not offset from each other and the axes of both ends of only the second support shaft are offset, the first power rollers cannot perform swinging motion relative to the first trunnions. However, because the first and second output disks are supported on the casing through radial bearings that support only radial loads and because the second power rollers are mounted swingable to the second trunnions, this toroidal continuous variable transmission can absorb changes in the thrust-directional position of the speed change units caused by deformations of these disks.

Furthermore, because the first and second output disks are supported on the casing directly or through the output shaft by the radial bearings that support only radial loads and the first power rollers cannot perform swinging motion, the thrust-directional positions of the first input disk and the first output disk with respect to the casing are first determined in such a way that the centers of the toroidal surfaces of these disks coincide with the tilt axes of the first trunnions, followed by the thrust-directional positions of the output shaft, the second output disk, the second power rollers and the second input disk being determined successively in that order. As explained above, the positions in the thrust direction of the input disks and the output disks forming the toroidal speed change units are determined by the power rollers as a reference which have high dimensional precision.

In this toroidal continuous variable transmission constructed as described above, because the thrust-directional positions of the input disks and the output disks forming the toroidal speed change units are determined by one of the pairs of power rollers which have high dimensional precision, there is no need to increase the machining precision of a part of the casing where the bearings are mounted, as is required by the conventional transmission, thus obviating the selection of shims during assembly and lowering the cost.

When the casing is made of aluminum for lighter weight, the difference in thermal expansion coefficient between the casing and the steel input disk, output disk or output shaft unavoidably causes excess plays between these components in the conventional toroidal continuous variable transmissions. With the toroidal continuous variable transmission of this invention, however, because the thrust-directional positioning of the input disk and the output disk is performed with one of the pairs of power rollers which have high machining precision-taken as a reference, a variety of problems, such as unwanted plays due to temperature variations, wear caused by excess plays and interference between trunnions and disks having too small clearances therebetween, are all eliminated, assuring reliable performance.

DETAILED DESCRIPTION OF THE EMBODIMENT

Figure 1:
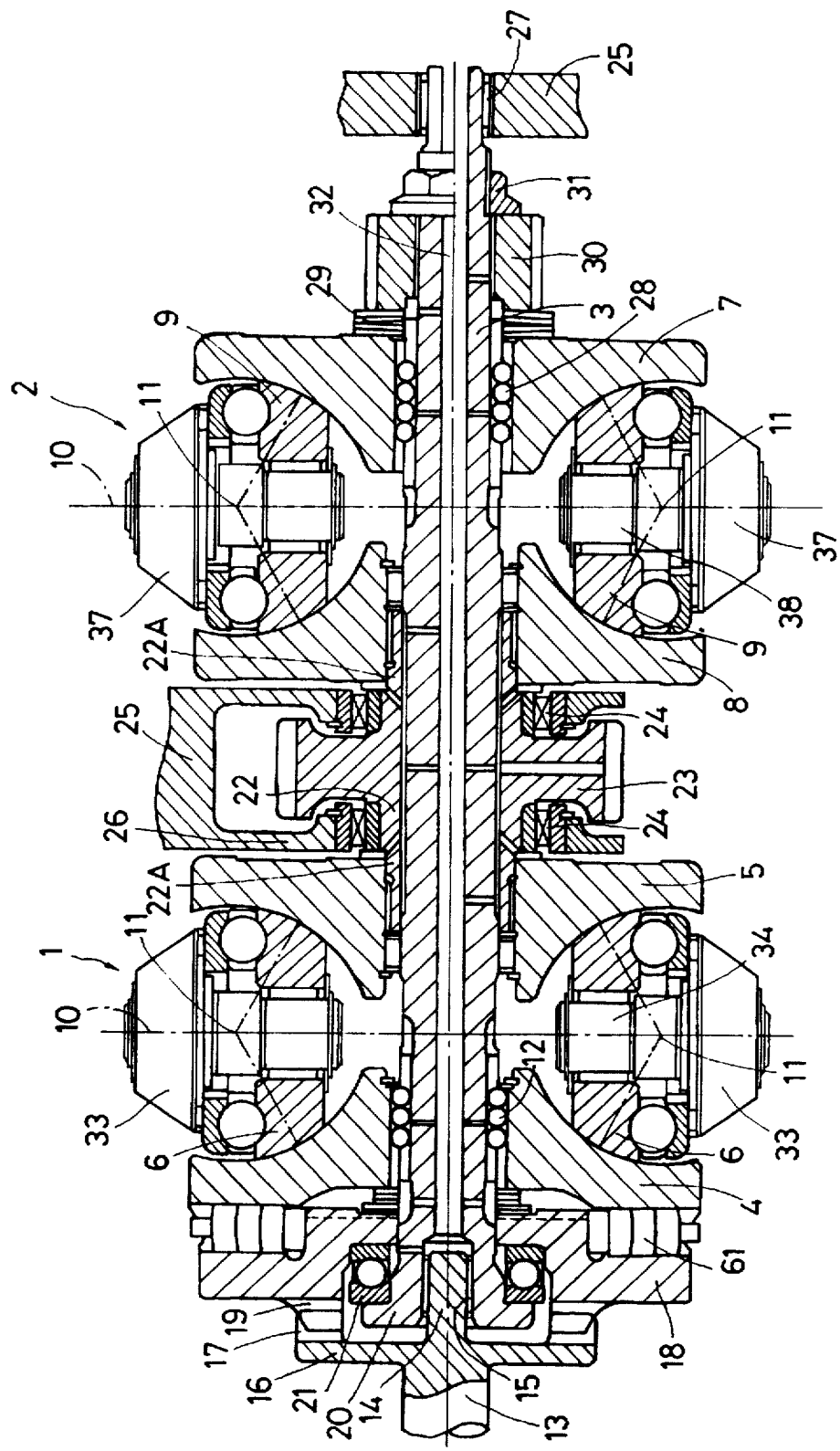
FIG. 1 is a cross section of one embodiment of the toroidal continuous variable transmission of this invention.

Embodiments of the toroidal continuous variable transmission according to this invention will be described according to the accompanying drawings.

This toroidal continuous variable transmission is a double cavity type, in which two toroidal speed change units 1, 2 are mounted side by side on the main shaft 3. The toroidal speed change unit 1 comprises an input disk 4, an output disk 5 disposed opposite the input disk 4, and power rollers 6 disposed between the input disk 4 and the output disk 5 and in frictional engagement with the toroidal surfaces of the disks 4, 5. The toroidal speed change unit 2, like the toroidal speed change unit 1, also comprises an input disk 7, an output disk 8 disposed opposite the input disk 7, and power rollers 9 disposed between the input disk 7 and the output disk 8 and in frictional engagement with the toroidal surfaces of the disks 7, 8. Each of the toroidal speed change units 1, 2 is provided with two power rollers 6, 6, 9, 9. The power rollers 6, 6 and the power rollers 9, 9 are rotatable on their own rotating axes 10 and tiltable about tilt axes 11 extending perpendicular to the rotating axes 10.

The input disk 4 is mounted on one end of the main shaft 3 through a ball spline 12 so that it can be moved in the axial direction of the main shaft 3 and rotate together with the main shaft 3. The power from the engine is supplied through a torque converter to the input shaft 13. The input shaft 13 is arranged on the same axis of the main shaft 3. A front end portion 14 of the input shaft 13 is fitted into a center hole 15 formed at one end of the main shaft 3 and supported relatively rotatable. A flange portion 16 formed at the end of the input shaft 13 is provided with claws 17. Opposite the flange portion 16 is a loading cam 18 which is provided with claws 19 that engage with the claws 17. Through the engaged claws 17, 19 the torque is transferred from the input shaft 13 to the loading cam 18. A thrust bearing 21 is installed between the loading cam 18 and the flange portion 20 formed at the end of the main shaft 3.

The output disk 5 and the output disk 8 are spline-connected at their backs to cylindrical portions 22A provided on both sides of an output shaft 22 so that the two output disks can be rotated together. The output shaft 22 is a hollow shaft fitted over the main shaft 3 and has an output gear 23 integrally formed at an intermediate part of the hollow shaft. The output disk 5 and the output disk 8 are supported on walls 26 of the casing 25 by radial bearings, i.e., roller bearings 24, which support radial loads through the output shaft 22.

The other end of the main shaft 3 is rotatably supported on the casing 25 through a bearing 27. The input disk 7 is supported on the main shaft 3 through the ball spline 28 so that it can be moved in the axial direction of the main shaft 3 and rotated together with the main shaft 3. On the back side of the input disk 7 is installed a disc spring 29, which is securely mounted by tightening a nut 31 with a spacer 30 interposed between. The input disk 7 is urged toward the output disk 8 by the disc spring 29. The main shaft 3 has an axially extending oil passage 32 therein, which constitutes a lubricating oil passage. The oil passage 32 branches to supply a lubricating oil to the toroidal surfaces of the toroidal speed change units 1, 2, ball splines 12, 28, and bearings 21, 24.

Figure 2:
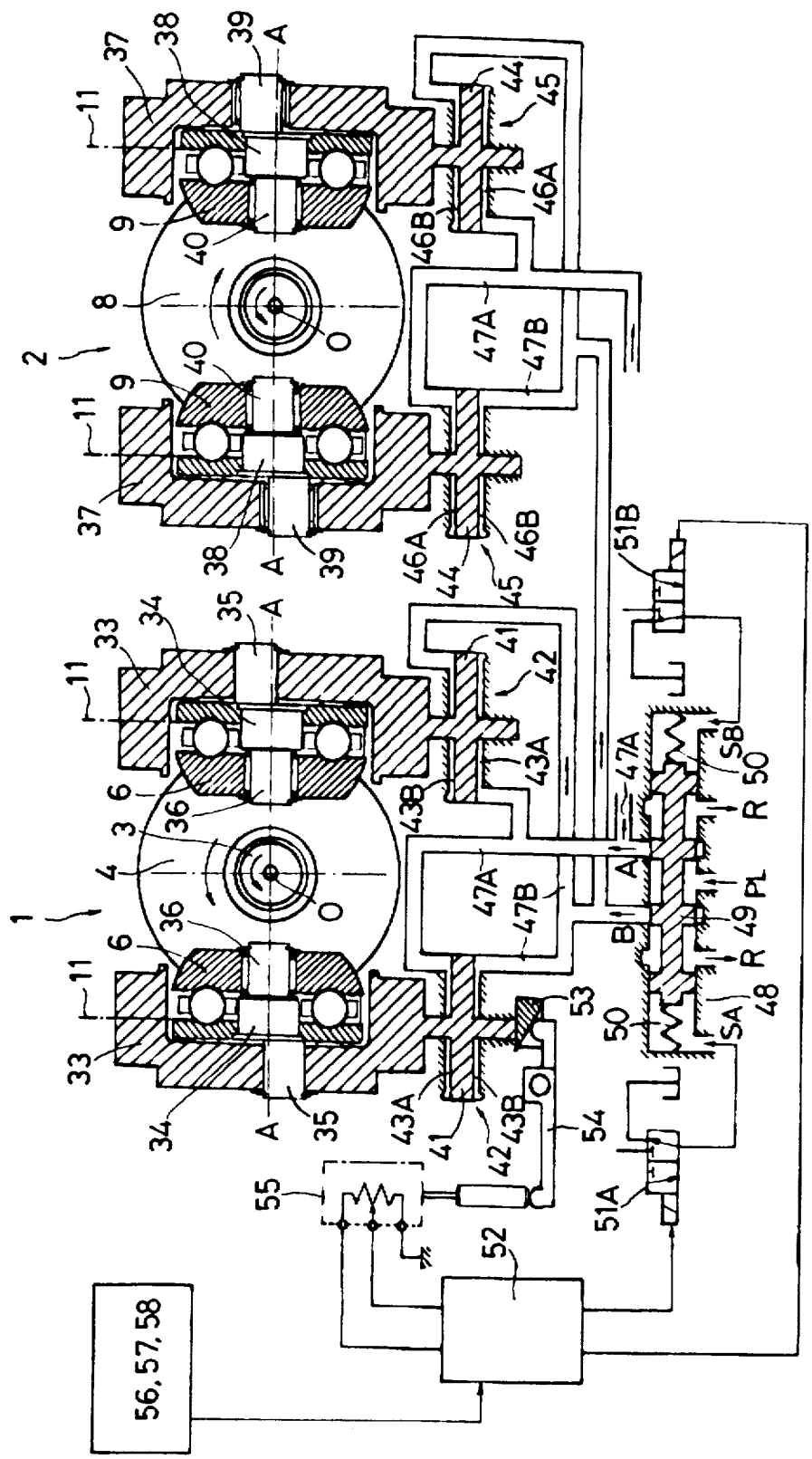
FIG. 2 is a schematic view showing the overall configuration of the toroidal continuous variable transmission of FIG. 1 including a controller for the transmission.

A pair of power rollers 6 in frictional contact with the toroidal surface of the input disk 4 and with the toroidal surface of the output disk 5 are rotatably supported on support shafts 34 secured to the trunnions 33, as shown in FIG. 2. The support shafts 34 have the axes of their ends offset from each other, that is, they form eccentric shafts, with one end 35 secured to the trunnions 33 and the other end 36 rotatably supporting the power rollers 6. Because the support shafts 34 are secured unrotatable or unpivotable to the trunnions 33, the power rollers 6 cannot be swung even when subjected to external forces.

Thus, when the input disk 4 and the output disk 5 are elastically deformed, their displacements in the thrust direction cannot be absorbed by the support shafts 34. The displacement of the input disk 4 is transmitted to the main shaft 3 through the thrust bearing 21, causing the main shaft 3 to move in the axial direction to absorb the displacement. Because the output disk 5 is supported on the wall 26 of the casing 25 by the radial bearing 24, when the output disk 5 is elastically deformed, it can be moved axially together with the output disk 8 toward the input disk 7.

A pair of power rollers 9, 9 frictionally engaged with the toroidal surface of the input disk 7 and with the toroidal surface of the output disk 8 are rotatably supported on the support shafts 38 that are pivotably supported on the trunnions 37. That is, the support shafts 38 have the axes of their ends offset from each other, i.e., they form eccentric shafts, with one end 39 pivotably supported on the trunnions 37 and the other end 40 rotatably supporting the power rollers 9. Hence, when the input disk 7 and the output disk 8 are elastically deformed, the power rollers 9 supported on the support shafts 38 can swing to absorb the positional changes in the thrust direction.

The thrust force generated by the action of the loading cam 18 elastically deforms the input disk 4, the output disk 5, the input disc 7 and the output disk 8. As described above, the support shafts 34 and the support shafts 38 are eccentric shafts with the axes of their ends offset from each other. The support shafts 34 are mounted unpivotable to the trunnions 33 while the support shafts 38 are mounted pivotable to the trunnions 37. Hence, the power rollers 6 cannot swing relative to the trunnions 33. However, because the output disk 5 and the output disk 8 are supported on the casing 25 through the radial bearings 24 that support only radial loads and the power rollers 9 are supported swingable on the trunnions 37, the positional changes in the thrust direction of the disks 4, 5, 7, 8 due to elastic deformations are absorbed by the thrust-directional displacement of the main shaft 3 and by the swinging motion of the power rollers 9.

Because the output disk 5 and the output disk 8 are supported on the casing 25 through the radial bearings 24 that support only radial loads, the thrust-directional positions of the output disks 5, 8 relative to the casing 25 can change. As for the support shafts 34, because the support shafts 34 are secured to the trunnions 33 and the power rollers 6 supported on the support shafts 34 cannot swing, the power rollers 6 constitute the reference for determining the thrust-directional positions of the speed change units with respect to the casing 25. In other words, the thrust-directional positions of the input disk 4 and the output disk 5 relative to the casing 25 are determined so that the centers of the toroidal surfaces of the disks 4, 5 coincide with the tilt axes 11 of the trunnions 33. Subsequently, the thrust-directional positions of the output shaft 22, the output disk 8, the power rollers 9, and the input disk 7 are determined in that order. The input disks 4, 7, the output disks 5, 8 and the output shaft 22 are generally made of steel. Where the casing 25 is made of an aluminum material for lighter weight, the toroidal continuous variable transmission of this embodiment can still perform precise positioning in the thrust direction of the disks 4, 5, 7, 8 without having to fabricate the casing 25 with high dimensional precision as required by the conventional toroidal continuous variable transmission. Because the thrust-directional positions are determined by the power rollers 6 he components whose manufacture precision is high t is possible to make accurate positioning in the thrust direction even if the casing dimensional precision is low, thereby preventing plays from being produced by thermal expansion differences when temperature changes occur.

The trunnions 33 are supported on the casing 25 so that they are pivotable and axially movable. The trunnions 33 have the tilt axes 11 and can be moved in the axial direction of the tilt axes 11 and also pivot about the tilt axes 11. The tilt axes 11 of the trunnions 33 are provided with pistons 41 that are slidably installed in hydraulic cylinders 42 formed in the casing 25. In the hydraulic cylinders 42 the pistons 41 define a speed-increase side cylinder chamber 43B and a speed-decrease side cylinder chamber 43A. When an oil pressure is supplied to the speed-increase side cylinder chamber 43B, the transmission shifts to the speed-increase side. When the oil pressure is supplied to the speed-decrease side cylinder chamber 43A, the transmission shifts to the speed-decrease side.

The trunnions 37, like the trunnions 33, are supported on the casing 25 so that they are pivotable and axially movable. The trunnions 37 have the tilt axes 11 and can be moved in the axial direction of the tilt axes 11 and also pivot about the tilt axes 11. The tilt axes 11 of the trunnions 37 are provided with pistons 44 that are slidably installed in hydraulic cylinders 45 formed in the casing 25. In the hydraulic cylinders 45 the pistons 44 define a speed-increase side cylinder chamber 46B and a speed-decrease side cylinder chamber 46A. When an oil pressure is supplied to the speed-increase side cylinder chamber 46B, the transmission shifts to the speed-increase side. When the oil pressure is supplied to the speed-decrease side cylinder chamber 46A, the transmission shifts to the speed-decrease side.

The hydraulic cylinders 42 and the hydraulic cylinders 45 communicate with each other through oil passages 47A, 47B. The speed-increase side cylinder chambers 43B of the hydraulic cylinders 42 communicate with the speed-increase side cylinder chambers 46B of the hydraulic cylinders 45 through an oil passage 47B. The speed-decrease side cylinder chambers 43A of the hydraulic cylinders 42 communicate with the speed-decrease side cylinder chambers 46A of the hydraulic cylinders 45 through an oil passage 47A. The speed-increase side cylinder chambers 43B, 46B communicate with a B port of a spool valve 48 through the oil passage 47B. The speed-decrease side cylinder chambers 43A, 46A communicate with an A port of the spool valve 48 through the oil passage 47A.

In the spool valve 48 is slidably disposed a spool 49, which is held at a neutral position by springs 50 installed at the axial ends of the spool valve 48. The spool valve 48 is formed at one end with an SA port and at the other end with an SB port, the SA port being supplied with a pilot pressure through a solenoid valve 51A, the SB port with a pilot pressure through a solenoid valve 51B. The spool valve 48 has a PL port leading to a line pressure (oil pressure source), an A port leading to the speed-decrease side cylinder chambers 43A, 46A through the oil passage 47A, a B port leading to the speed-increase side cylinder chambers 43B, 46B through the oil passage 47B, and T ports leading to a reservoir R. The solenoid valves 51A, 51B in response to control signals output from a controller 52, displace the spool 49 in the axial direction.

The tilt axis 11 of the trunnion 33 is connected at its end with a precess cam 53, which is engaged with one end of a lever 54 which is pivotally supported at the center. The other end of the lever 54 is connected to the potentiometer 55. The potentiometer 55 measures the axial displacement and tilt angle of the tilt axis 11 of the trunnion 33 to produce a synthesized displacement signal, and feeds it to the controller 52. This toroidal continuous variable transmission has a car speed sensor 56, an engine revolution sensor 57, a throttle opening sensor 58 and the like to send speed change information signals such as car speed, engine revolution and throttle opening to the controller 52. The controller 52, according to these speed change information, sends control signals to the solenoid valves 51A, 51B.

Next, the operation of the toroidal continuous variable transmission will be explained. When the engine is started, the power of the engine is transferred through the torque converter to the input shaft 13, from which it is further transferred through the loading cam 18 to the input disk 4. As the input disk 4 rotates, the power rollers 6 are driven to transfer the rotation to the output disk 5. At the same time, the torque supplied to the input disk 4 is conveyed to the main shaft 3 and further to the input disk 7 that rotates with the main shaft 3. Then, the rotation of the input disk 7 is transferred through the power rollers 9 to the output disk 8.

Normally, the trunnions 33, 37 are at a neutral position for a certain transmission ratio. The neutral position is where the rotating center line A—A of the input disks 4, 7 and the output disks 5, 8 and the rotating center O of the power rollers 6, 9 intersect. The speed change is done by displacing the trunnions 33, 37 in the axial direction of the tilt axis 11 from the neutral position. When, during torque transmission, the trunnions 33, 37 are displaced in the tilt axis direction, the trunnions 33, 37 tilt about the tilt axes 11 in a direction and at a speed corresponding to the direction and amount of the displacement, changing the ratio of a radius described by the frictional contact point between the input disks 4, 7 and the power rollers 6, 9 to a radius described by the frictional contact point between the output disks 5, 8 and the power rollers 6, 9, thereby performing continuous speed change.

The tilting of the power rollers 6, 9 is performed by the controller as follows. First, the controller 52 calculates actual transmission ratio from the synthesized displacements of the trunnions 33, 37 detected by the potentiometer 55, sets target displacements of the trunnions 33, 37 according to the deviation between the target transmission ratio and the actual transmission ratio, and outputs control signals to the solenoid valves 51A, 51B. Then, oil pressures SB, SA are supplied from the solenoid valves 51A, 51B to the ends of the spool valve 48.

When the oil pressures SB and SA supplied to the spool valve 48 have a relation of SA<SB, the spool 49 shifts toward left in FIG. 2 to connect the oil passage 47B to a pressure source through the PL port and the oil passage 47A to the reservoir R through the T port, causing the pressure Pup of the oil passage 47B to become higher than the pressure Pdown of the oil passage 47A (Pup>Pdown). As a result, the pressure difference between the cylinder chambers 43A and 43B causes the trunnion 33 on the right side of the toroidal speed change unit 1 in FIG. 2 to move down and the trunnion 33 on the left side to move up.

Similarly, the trunnion 37 on the right side of the toroidal speed change unit 2 moves down and the trunnion 37 on the left side moves up. As the trunnions are displaced vertically in this way, the trunnions 33, 33 and the trunnions 37, 37 tilt about the tilt axes 11, initiating the speed change sequence for increasing the speed. The controller 52 performs a feedback control to make the actual transmission ratio approach the target transmission ratio. As the actual transmission ratio approaches the target transmission ratio, the target displacement of each trunnion 33, 33, 37, 37 comes close to zero. When the actual transmission ratio agrees the target transmission ratio, the target displacements of the trunnions 33, 33, 37, 37 become zero, returning the power rollers 6, 9 to the neutral position, finishing the speed change sequence.

Figure 3:
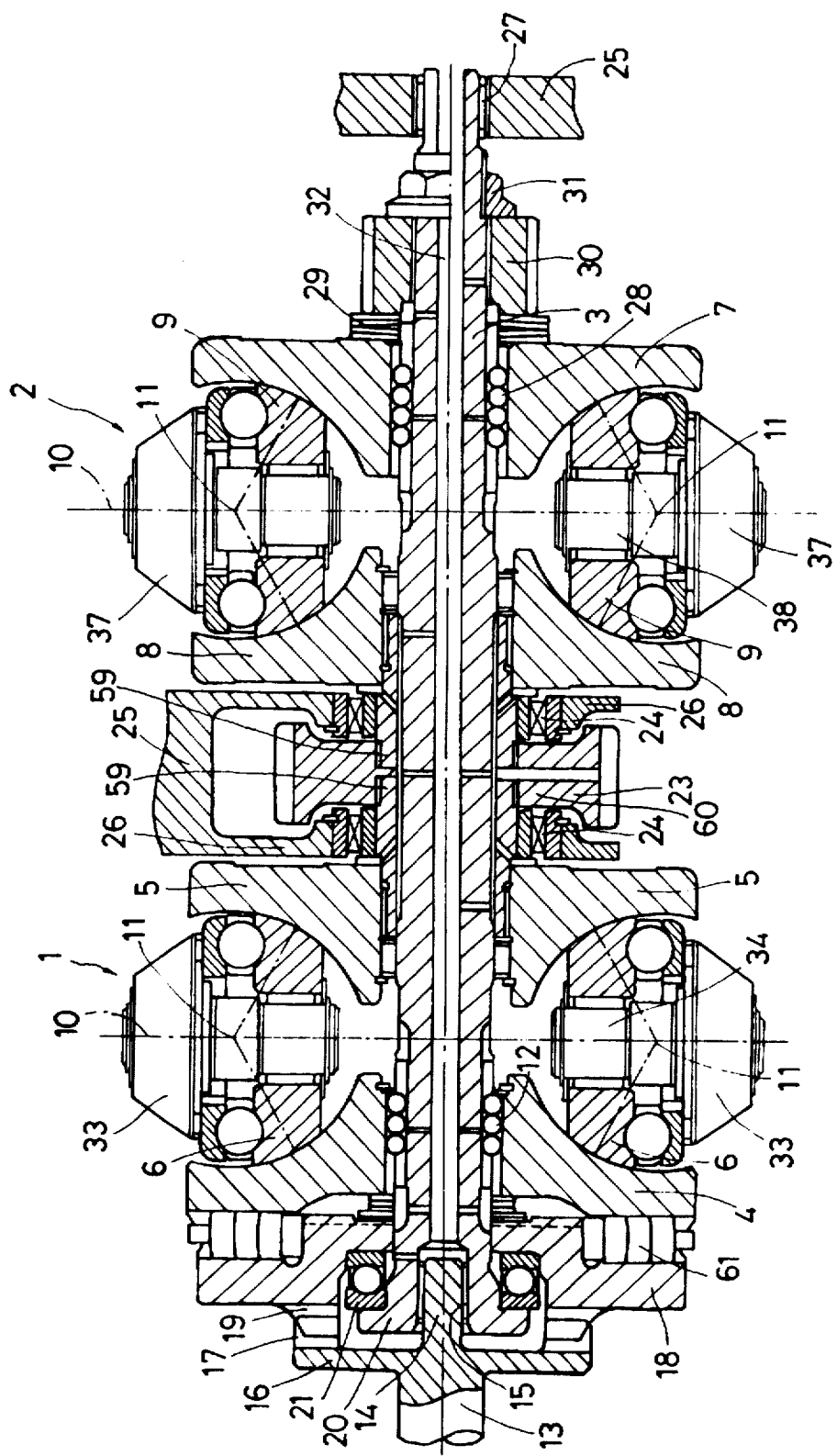
FIG. 3 is a cross section of another embodiment of the toroidal continuous variable transmission of this invention.

Next, by referring to FIG. 3, another embodiment of the toroidal continuous variable transmission of this invention will be described. This embodiment differs from the first embodiment of FIG. 1 in the structure of the back of the output disks 5, 8, the structure of the output shaft 22, and the structure for supporting the output disks 5, 8 on the wall 26 of casing 25. In other respects, constructions are similar to the first embodiment. The identical parts are given like reference numerals and explanation will center on these differing structures.

The output disk 5 and the output disk 8 each have cylindrical portions 59, 59 extending axially from their back. An output gear 60 as the output shaft bridges the both cylindrical portions 59, 59 and engages them so that it can rotate together with the cylindrical portions 59, 59. The output disk 5 and the output disk 8 are directly supported on the walls 26 of the casing 25 through the radial bearings 24 that support only radial loads.

Next, by referring to FIG. 4, still another embodiment of the toroidal continuous variable transmission will be explained. This embodiment shown in FIG. 4 differs from the first embodiment of FIG. 2 in the structure of support shafts 34, 34 and the mounting structure on the trunnions 33, 33. In other respects, constructions are similar to those shown in FIG. 1 and 2. The identical parts are given like reference numerals and explanation will center on these differing structures.

The support shafts 34, 34 are formed straight without offsetting the axes of their ends 35, 36. One end 35, 35 of the support shafts 34, 34 is mounted unpivotable or unrotatable on the trunnions 33, 33, and the other end 36, 36 of the support shafts 34, 34 rotatably supports the power rollers 6, 6. Because the power rollers 6,6 are positioned relative to the casing 25, they cannot swing with respect to the trunnions 33, 33. On the other hand, the support shafts 38, 38 are eccentric shafts with the axes of their ends 39, 40 offset from each other. One end 39, 39 of the support shafts 38, 38 is pivotably supported on the trunnions 37, 37, as in the conventional transmission, while the other end 40, 40 of the support shafts 38, 38 rotatably supports the power rollers 9, 9. That is, because the power rollers 9, 9 are swingably supported on the trunnions 37, 37, the toroidal continuous variable transmission of this embodiment can absorb changes in the thrust-directional position caused by deformations of the disks 4, 5, 7, 8.

Figure 4:
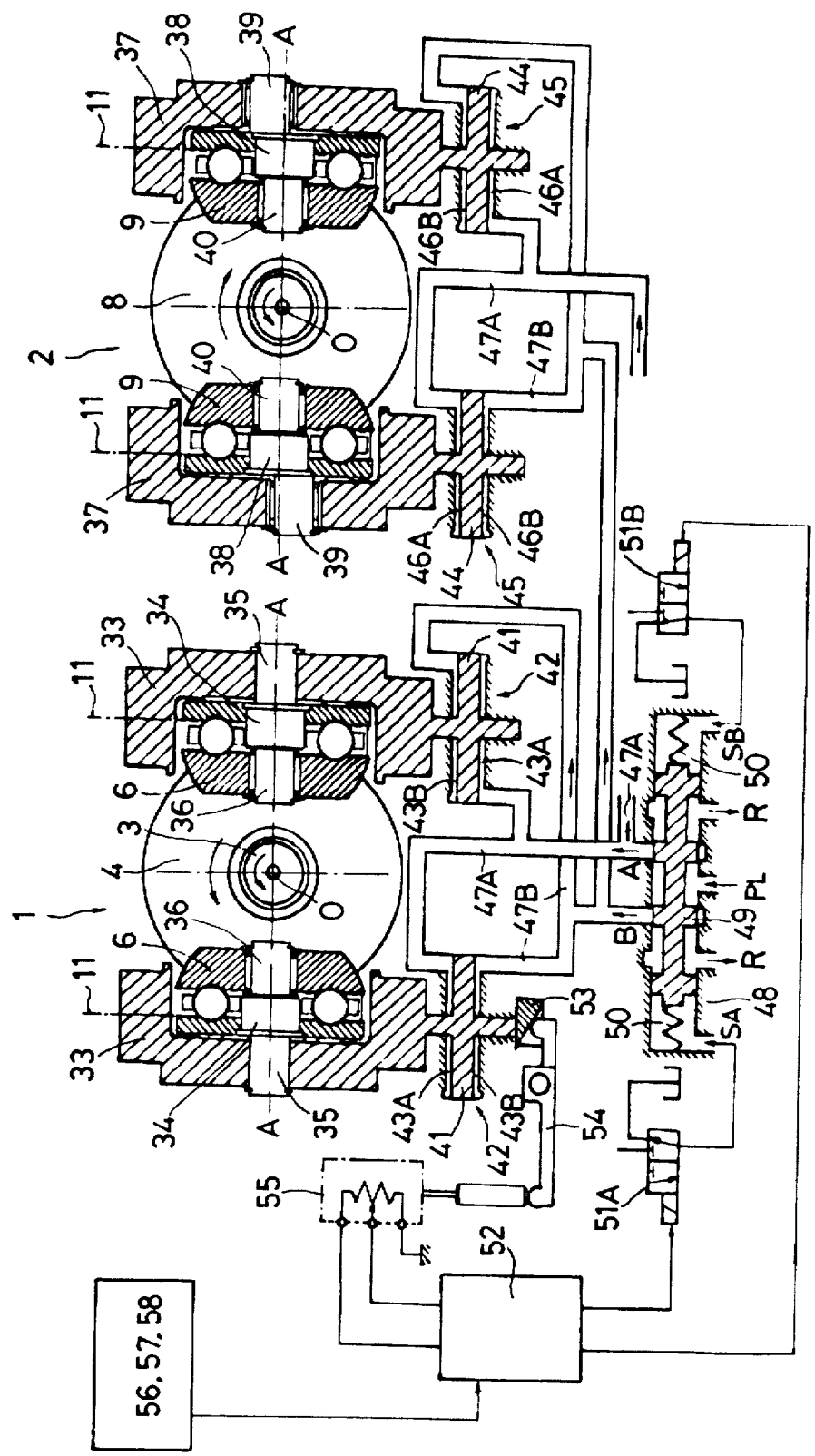
FIG. 4 is a schematic view showing the overall configuration of still another embodiment of the toroidal continuous variable transmission of this invention including a controller for the transmission.
Figure 5:
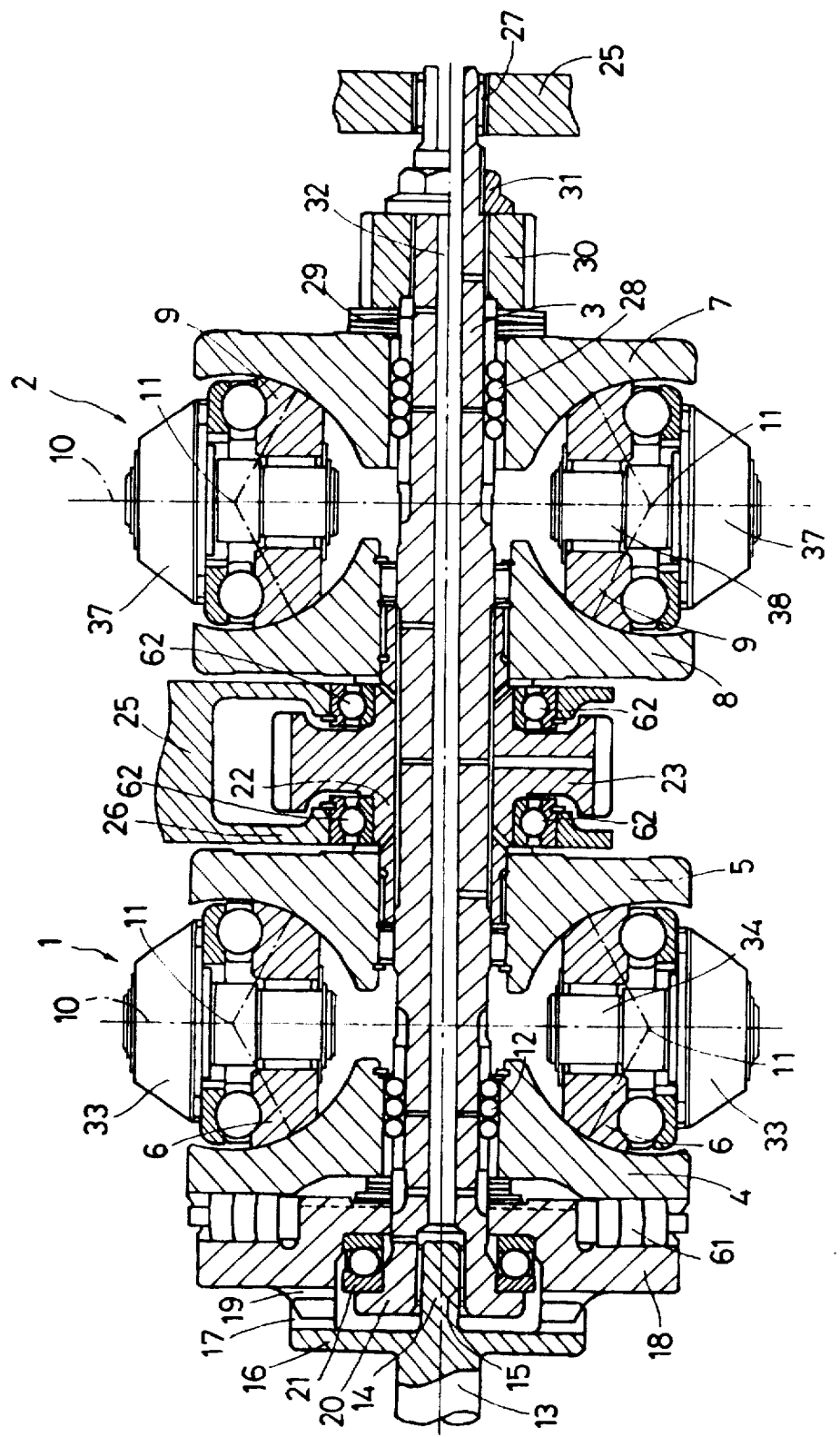
FIG. 5 is a cross section showing a conventional toroidal continuous variable transmission.
Figure 6:
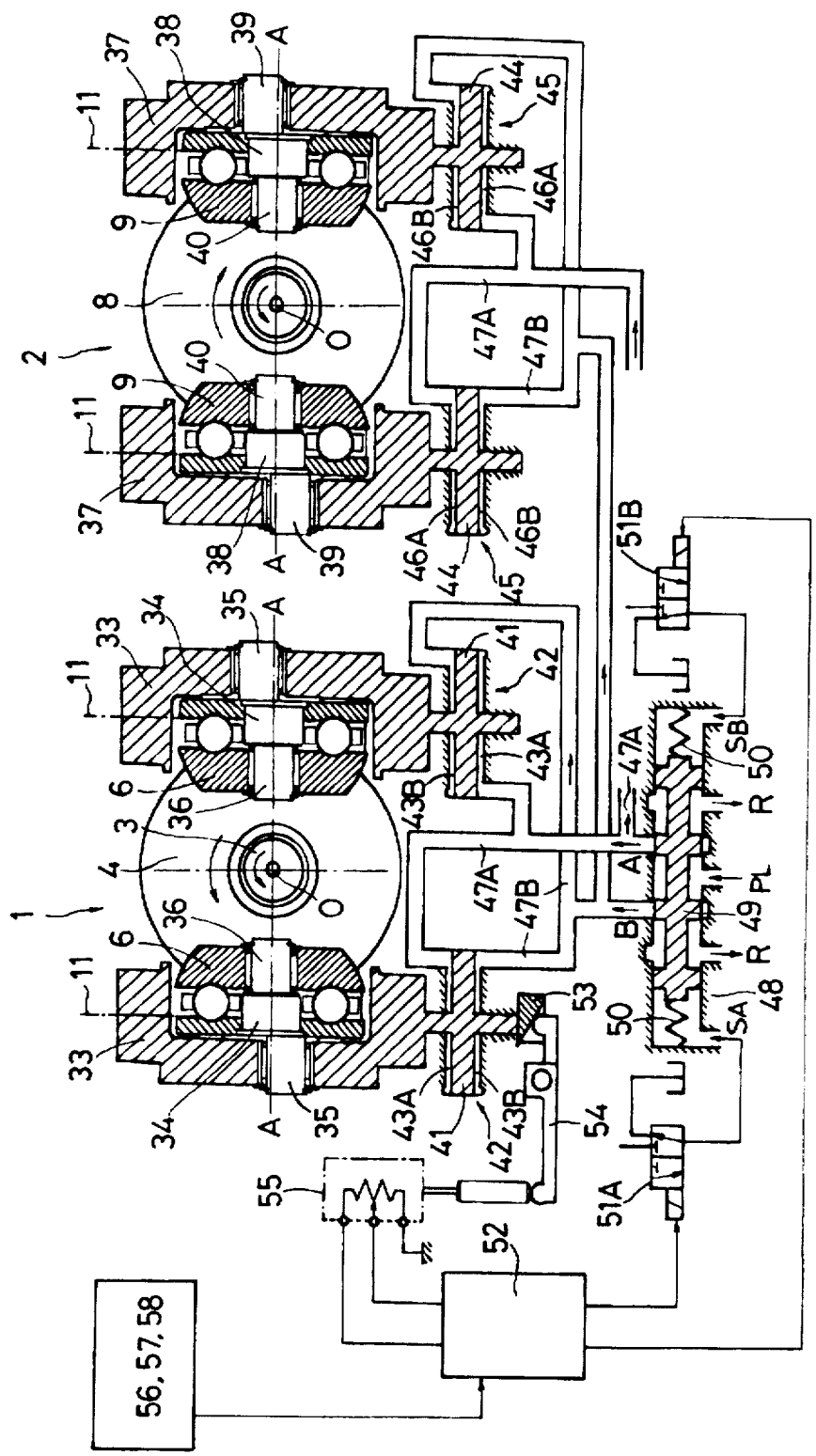
FIG. 6 is a schematic view showing the overall configuration of the conventional toroidal continuous variable transmission of FIG. 5 including a controller for the transmission.

While, in the embodiment of FIG. 4, the one end 35, 35 of the support shafts 34, 34 is mounted unpivotable on the trunnions 33, 33, because the axes of both ends 35, 36 of the support shafts 34, 34 are not offset, they can be pivotably mounted on the trunnions 33, 33.

Although, in the above embodiments, only the power rollers 9, 9 are shown to perform the swinging motion with the power rollers 6, 6 not performing the swinging action, it is possible to set only the power rollers 6, 6 to perform the swinging motion and the power rollers 9, 9 not to oscillate.

What is claimed is:

1. A toroidal continuous variable transmission comprising:

a first input disk and a second input disk, both rotatable together with a main shaft and axially movable;

an input shaft for transferring power to the first input disk through a loading cam;

a first output disk disposed opposite the first input disk and rotatable relative to the main shaft;

a pair of first power rollers for continuously changing the speed of rotation of the first input disk according to changes in a tilt angle with respect to the first input disk and the first output disk and transferring the speed-changed rotation to the first output disk;

a first support shaft for rotatably supporting at one end thereof one of the first power rollers;

a first trunnion mounted to the other end of the first support shaft and having a tilt axis, the first trunnion being adapted to be displaced in a direction parallel to its tilt axis from a neutral position and to tilt about its tilt axis;

a second output disk disposed opposite the second input disk and rotatable relative to the main shaft;

a pair of second power rollers for continuously changing the speed of rotation of the second input disk according to changes in a tilt angle with respect to the second input disk and the second output disk and transferring the speed-changed rotation to the second output disk;

a second support shaft for rotatably supporting at one end thereof one of the second power rollers;

a second trunnion mounted to the other end of the second support shaft and having a tilt axis, the second trunnion being adapted to be displaced in a direction parallel to its tilt axis from a neutral position and to tilt about its tilt axis; and an output shaft connected with the first output disk and the second output disk, the first and second output disks being disposed adjacent to each other;

wherein the first output disk and the second output disk are supported on a casing between the output disks through radial bearings, axes of both ends of the first support shaft and of the second support shaft are offset from each other, one of the first and second support shafts is secured nonpivotable to its respective trunnion, and the other support shaft is mounted pivotable to its respective trunnion.

2. A toroidal continuous variable transmission according to claim 1, wherein the output disk is mounted unrotatable to a cylindrical portion of the output shaft and the cylindrical portion of the output shaft is supported on the casing through the radial bearings.

3. A toroidal continuous variable transmission according to claim 1, wherein the output shaft is mounted unrotatable to a cylindrical portion of the output disk and the cylindrical portion of the output disk is supported on the casing through the radial bearings.

4. A toroidal continuous variable transmission comprising:

a first input disk and a second input disk, both rotatable together with a main shaft and axially movable;

an input shaft for transferring power to the first input disk through a loading cam;

a first output disk disposed opposite the first input disk and rotatable relative to the main shaft;

a pair of first power rollers for continuously changing the speed of rotation of the first input disk according to changes in a tilt angle with respect to the first input disk and the first output disk and transferring the speed-changed rotation to the first output disk;

a first support shaft for rotatably supporting at one end thereof each of the first power rollers;

a first trunnion mounted to the other end of the first support shaft and having a tilt axis, the first trunnion being adapted to be displaced in a direction parallel to its tilt axis from a neutral position and to tilt about its tilt axis;

a second output disk disposed opposite the second input disk and rotatable relative to the main shaft;

a pair of second power rollers for continuously changing the speed of rotation of the second input disk according to changes in a tilt angle with respect to the second input disk and the second output disk and transferring the speed-changed rotation to the second output disk;

a second support shaft for rotatably supporting at one end thereof one of the second power rollers;

a second trunnion mounted to the other end of the second support shaft and having a tilt axis, the second trunnion being adapted to be displaced in a direction parallel to its tilt axis from a neutral position and to tilt about the tilt axis; and an output shaft connected with the first output disk and the second output disk, the first and second output disks being disposed adjacent to each other;

wherein the first and second output disks are supported on walls of a casing between the output disks through radial bearings, axes of both ends of one of the first and second support shafts are offset from each other, the support shaft whose axis is not off-centered is secured nonpivotable to its respective trunnion, and the support shaft whose axis is off-centered is mounted pivotable to its respective the trunnion.

5. A toroidal continuous variable transmission according to claim 4, wherein the output disk is mounted unrotatable to a cylindrical portion of the output shaft and the cylindrical portion of the output shaft is supported on the casing through the radial bearings.

6. A toroidal continuous variable transmission according to claim 4, wherein the output shaft is mounted unrotatable to a cylindrical portion of the output disk and the cylindrical portion of the output disk is supported on the casing through the radial bearings.

* * * * *